United States Patent Office 3,161,054
Patented Dec. 15, 1964

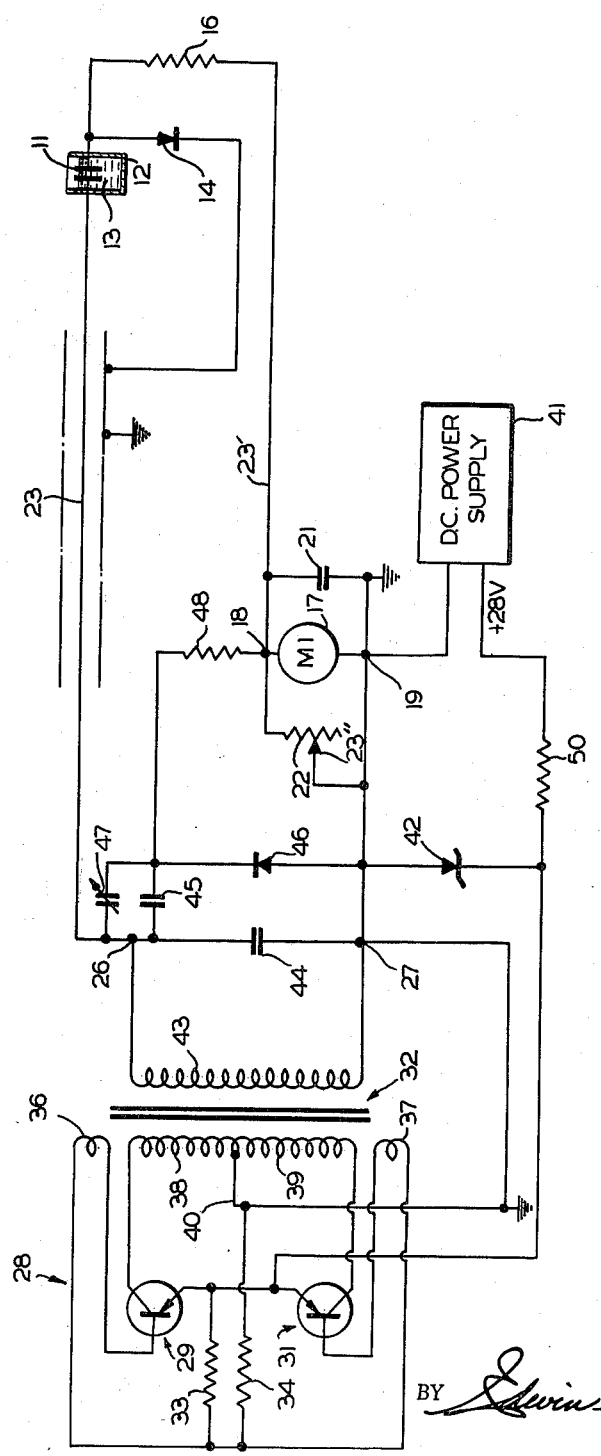

3,161,054
CAPACITY-TYPE MEASURING SYSTEM
Irving H. Cohn, New York, N.Y., assignor to Simmonds Precision Products, Inc., Tarrytown, N.Y., a corporation of New York
Filed Dec. 20, 1961, Ser. No. 160,799
6 Claims. (Cl. 73—304)

The present invention relates to electrical measuring circuits, and more particularly it relates to capacity-type measuring systems.

In modern aircraft, for example, capacity-type fuel measuring systems often are employed for determining the quantity of a liquid fuel in a tank. Such a system consists of: a measuring capacitor whose capacity changes with the level of the fuel, a circuit for producing a signal that is related to the capacity, and a fuel gauge that includes a meter for responding to said signal.

Many different kinds of circuits are known for producing a signal that is related to changes in the capacity of a capacitor. In one of these, a rectifier is connected in series with the measuring capacitor. A sine wave voltage waveform is applied to the capacitor and rectifier for charging the capacitor through the rectifier during alternate half cycles of the waveform. A D.C. (direct current) ammeter discharges the capacitor during the other half cycles of the waveform. The average current that is indicated by the ammeter is related to the capacity of the capacitor which, in turn, is related to a variable non-electrical condition.

The circuit described above is impractical for aircraft fuel gauge systems, and it has not been used for such a purpose. To be accurate, a crystal-controlled oscillator would be required to generate the sine wave voltage waveform. Because the measuring capacitor must be placed in the fuel tank at a location that is remote from the other components of the circuit, the capacitor must be connected to the other components by a relatively long cable or cables. Therefore, the cable capacity would be required to be tuned out. Individual tuning adjustments would be needed for each installation. This would be necessary because the cable lengths are relatively long and vary from one installation to the next. Furthermore, the cables are not supplied by the fuel gauge manufacturer. Also, since tuned circuits are involved and because all tuned circuits tend to drift, the circuit would not remain stable and accurate for long periods and over the varying environmental conditions that aircraft fuel measuring systems are subjected to.

Known circuits that are used in aircraft fuel measuring systems also suffer from at least some of the above disadvantages. Moreover, some of these systems are very complicated and expensive to manufacture.

Therefore, it is an object of the present invention to provide an improved circuit for producing a signal that is accurately related to a property of an electrical element.

A further object is to provide an improved circuit for producing a signal that is accurately related to a capacity whose value depends upon a variable condition.

Another object is to provide a practical circuit for producing a signal that is accurately related to a capacity within a range from 30 to 200 micro-microfarads.

It is another object to provide a capacity-type measuring system that has very good operating stability for long periods and over varying environmental conditions.

Another object is to provide a capacity-type fuel measuring system that is accurate, easy to construct, and is relatively inexpensive to manufacture.

Still another object is to provide a capacity-type fuel measuring system that can be installed without compensating for variations in the lengths of cables between the fuel gauge and the measuring capacitor.

Still a further object is to provide such a system that operates directly from a relatively low voltage power supply.

The foregoing and other objects and advantages of the invention, which will become more apparent from the detailed description of the drawings, are achieved by placing a measuring capacitor in a tank containing a quantity of fuel to be measured. On one half cycle of a square wave voltage waveform produced by a saturable-core oscillator, the measuring capacitor is charged rapidly through a rectifier. On the other half cycle of the square wave voltage waveform, the capacitor is discharged through a resistor in series with a D.C. current meter. The average current read by the meter is related accurately to the capacity of the measuring capacitor and, therefore, the quantity of fuel in the tank can be determined.

In the drawings, the sole figure is a schematic illustration of a capacity-type fuel measuring system in accordance with the invention.

Referring to the drawings, the numeral 11 refers to a measuring capacitor that is placed in a tank 12 of a fuel tank unit for an aircraft, for example. The tank 12 contains a liquid fuel 13 whose quantity is desired to be measured. In a manner known in the art, the capacitor 11 is supported in tank 12 so that the capacity of the capacitor 11 changes with the level of the fuel 13.

One side of the measuring capacitor 11 is connected to ground by a diode rectifier 14. The grounded shield of a shielded cable 23 is used for the ground connection to rectifier 14, for example. One end of a resistor 16 is connected to the junction between capacitor 11 and the anode of rectifier 14. The rectifier 14 and the resistor 16 are mounted on the fuel tank unit, for example. The fuel tank unit is at a different location from the other components of the fuel measuring system.

A D.C. (direct current) ammeter 17 has a terminal 18 connected to an end of resistor 16 by low impedance cable 23'. The other terminal 19 of ammeter 17 is connected to ground. The lengths of cables 23' and 23 depend upon the distance between the ammeter 17 and the tank unit, and these lengths vary with the particular installation.

The ammeter 17 is part of a fuel gauge and is designed to indicate the quantity of fuel within the tank 11. A smoothing capacitor 21 is connected across the ammeter terminals 18 and 19. A resistor 22 having an adjustable tap 23" also is connected across terminals 18 and 19 for adjusting the sensitivity of the ammeter.

One output terminal 26 of a conventional square wave voltage generator, generally referred to by 28, is connected to the measuring capacitor 11 by the cable 23. The other terminal 27 of generator 28 is connected to the grounded ammeter terminal 19.

The square wave voltage generator 28 is a saturable-core square wave oscillator consisting of a pair of identical transistors 29 and 31, a magnetic core transformer 32, and a pair of resistors 33 and 34.

The emitters of transistors 29 are connected to each other. The emitter of transistor 29 is connected to its base by resistor 33 and a primary winding 36 of transformer 32. The emitter of transistor 31 is connected to its base by the resistor 33 and another primary winding 37 of transformer 32. The windings 36 and 37 are alike.

The collector of transistor 29 is connected to ground for the circuit by a further primary winding 38 and a lead 40. The collector of transistor 31 is connected to ground by another primary winding 39 and the lead 40. The primary windings 38 and 39 are alike.

The resistor 34 is connected between the ground lead 40 and the terminal of resistor 33 that is connected to windings 36 and 37. The resistors 33 and 34 have different resistance values, and they establish the initial starting bias required for the bases of transistors 29 and 31.

The connection between the emitters of transistors 29 and 31 is connected to the positive terminal of a D.C. power supply 41 by a resistor 50. The negative terminal of the power supply is connected to ground. The power supply 41, which produces 28 volts, for example, may be the aircraft's power supply. The D.C. voltage that is applied to the transistors is regulated by a Zener diode 42.

The saturable-core square wave oscillator circuit 28 operates to develop a square wave voltage waveform across an output secondary winding 43 of the transformer 32. The output frequency and voltage are determined by the turns ratio of the primary and secondary windings of transformer 32 and the saturation flux of the transformer 32. A capacitor 44 is connected across the transformer winding 43 to produce a clean square wave voltage waveform.

One side of a capacitor 45 is connected to terminal 26 of the transformer winding 43. The other side of capacitor 45 is connected to resistor 48, the other side of resistor 48 being connected to the terminal 18 of the ammeter 17. The junction of capacitor 45 and resistor 48 is connected to the cathode of diode rectifier 46, the anode of which is connected to ground.

The capacitor-diode circuit 45, 46 is identical in their respective values with the capacitor-diode circuit 11, 14, when the tank 12 is empty except for the polarities of the diodes 46 and 14. Because the capacitor 11 has a finite capacity when the fuel tank 12 is empty, it is necessary to balance out the empty capacity with the capacitor 45. An adjustable trimmer capacitor 47 is connected across the capacitor 45 for proper balancing of the empty capacity.

The operation of the fuel measuring system is as follows. During each positive half cycle of the square wave voltage waveform, the capacitor 11 charges rapidly through the diode rectifier 14. The capacitor 45 charges less rapidly through the resistor 48 and the ammeter 17.

During each negative half cycle of the square wave voltage waveform, the capacitor 11 discharges through the resistor 16 and the meter 17 at a rate that is related to the level of the fuel 13 within the tank 12. The capacitor 45 discharges rapidly through the diode rectifier 46.

During the positive half cycles of the square wave voltage waveform, the current that flows through the ammeter 17 is in a direction that is opposite to the direction of the current that flows through the ammeter 17 during the negative half cycles. These opposite currents are averaged by the smoothing capacitor 21, and are equal when: the fuel tank 12 is empty and the empty tank capacity of capacitor 11 about equals the capacity of capacitor 45, the resistance values of the resistors 16 and 48 are equal, and the trimmer capacitor 47 is adjusted properly. Under these conditions, the D.C. ammeter 17 reads zero. Note that the sensitivity of the ammeter 17 can be varied by adjusting the tap 23" without changing the zero adjustment of the ammeter for an empty fuel tank.

With fuel 13 in the tank 12, the discharge time for capacitor 11 is changed according to the fuel level. Thus, the averaged current that flows in one direction through the ammeter 17 due to the discharging of capacitor 11 no longer equals the averaged current that flows in the opposite direction through the ammeter 17 due to the charging of capacitor 45. Consequently, the net current read by the ammeter 17 is related to the level of the fuel 13.

The average net current through the ammeter 17 is accurately proportional to the capacity of the capacitor 13, if the voltage and the frequency of the square wave voltage waveform are held constant. These are held constant by regulating the D.C. power supply voltage applied to the square wave oscillator. This regulation is accomplished by the Zener diode regulator 42.

It is apparent that the fuel measuring system described above is frequency insensitive at zero and is not affected by the lengths of the cables 23 and 23' between the ammeter 17 and the measuring capacitor 11, which are separated by a considerable distance. The lengths of any other cables that may be employed in the system also are immaterial. Thus, if the cable lengths vary from one installation to the next, the system does not have to be recalibrated.

The frequency of the oscillator is held relatively constant by regulating its input voltage by means of the Zener diode 42. Some frequency variation is experienced due to the variation of saturation flux density of the core with temperature. This is compensated for by the variation of the resistance of ammeter 17 due to the positive temperature coefficient of its coil.

Furthermore, it can be shown mathematically that the system is immune to variations in the resistance of the charging and discharging paths for each of capacitors 11 and 44. In addition: the system is extremely stable under varying environmental conditions, uses inexpensive parts, is simple to construct, and can be designed to operate directly from 28 volts direct current which is available in virtually all aircraft.

In one system that has been constructed for measuring the quantity of fuel in an aircraft tank, some of the circuit values that have been used are:

$C_{11}$=about 36 micro-microfarads (with tank 12 empty)
$C_{45}$=36 micro-microfarads
$R_{16}$=22 kilohms
$R_{48}$=22 kilohms
$C_{21}$=.01 microfarad
$C_{44}$=.01 microfarad In this circuit, the frequency of the square wave voltage waveform produced by oscillator 28 is fifteen kilocycles. The ammeter 17 is a 0–50 micro-ampere meter. The system has been tested satisfactorily over a temperature range from −55° centigrade to +70° centigrade and over an input voltage range from 24 to 32 volts D.C., with minimum errors.

Although the measuring circuit has been described with particular reference to measuring the quantity of a liquid fuel in an aircraft tank, many other uses for the circuit could be made.

Since changes could be made both in the illustrated embodiments of the invention and the above description, and different words of description could be used without departing from the scope and spirit of the invention, it is to be understood that the invention is limited solely by the appended claims.

I claim:

1. A capacity-type fuel measuring system comprising a saturable-core square wave oscillator, a capacitor having one side connected to a first output terminal of said oscillator, a rectifier connecting the other side of said capacitor to a second output terminal of said oscillator to form a charging circuit for said capacitor on positive waveforms of said oscillator, means for supporting said capacitor within a fuel tank for measuring the level of a fuel within the tank, a resistor having one end connected to the junction between said capacitor and said rectifier to provide a discharge path for said capacitor, a direct current meter at a location that is remote from said capacitor, means for connecting an ungrounded terminal of said meter to the other end of said resistor to complete said discharge path, and means for connecting the other terminal of said meter to the second output terminal of said oscillator.

2. The system set forth in claim 1, further including another capacitor and another resistor connected in series between the first output terminal of said oscillator and said one terminal of said meter, and another rectifier connected from the junction between said other capacitor and said other resistor to the second output terminal of said oscillator, the polarity of said other rectifier being reversed compared with the polarity of said first-mentioned rectifier.

3. The system set forth in claim 2, further including an adjustable trimmer-capacitor connected across said other capacitor.

4. An electrical measuring circuit comprising a source of square wave oscillations having a constant frequency and having output terminals thereof, a measuring responsive capacitance responsive in its value to a quantity to be measured, a rectifier, means connecting said measuring responsive capacitance and said rectifier across said output terminals in series so that positive half cycles from said source charge said measuring responsive capacitance through said rectifier, a network coupled across said output terminals including a series circuit comprising a capacitance of like value to said measuring responsive capacitance at its minimal value, said series circuit further including a rectifier of like value of said rectifier in circuit with said measuring responsive capacitance, a resistance and meter connected in series in circuit to a point intermediate said measuring responsive capacitance and its circuit connected to ground, said resistance and meter circuit forming a discharge path for said measuring responsive capacitance upon negative half cycles of said source, said meter forming a discharge path for the charge of said network, so that said meter provides an indication of the value of the measuring responsive capacitance when averaged with the charge of the network capacitance.

5. The circuit set forth in claim 4, wherein said source of square wave oscillations is a saturable-core square wave oscillator.

6. The circuit set forth in claim 5, further including a tank containing a liquid whose level is to be measured, and means for supporting said capacitor within said tank to relate the capacitance of said capacitor to the level of said liquid.

References Cited by the Examiner
UNITED STATES PATENTS

| | | | |
|---|---|---|---|
| 2,848,614 | 8/58 | Lyons | 331—113.1 |
| 2,929,986 | 3/60 | Mayes | 73—304 |
| 2,943,258 | 6/60 | Shawhan. | |
| 3,018,966 | 1/62 | Zelina | 331—113.1 |
| 3,039,051 | 6/62 | Locher | 324—61 |

ISAAC LISANN, *Primary Examiner.*